United States Patent [19]

Caldwell et al.

[11] 4,073,873

[45] Feb. 14, 1978

[54] CATALYTIC DECOMPOSITION OF HYPOCHLORITE

[75] Inventors: Donald Lee Caldwell, Lake Jackson; Raymond John Fuchs, Jr., Richwood, both of Tex.

[73] Assignee: The Dow Chemical Company, Midland, Mich.

[21] Appl. No.: 671,532

[22] Filed: Mar. 29, 1976

[51] Int. Cl.$^2$ .................. C01D 3/04; C01B 13/02; C01B 7/08; C01B 9/02

[52] U.S. Cl. .................................. 423/499; 423/481; 423/579; 423/491; 252/462; 252/472; 252/470

[58] Field of Search ................ 423/499, 579, 481, 491

[56] References Cited

U.S. PATENT DOCUMENTS

| | | | |
|---|---|---|---|
| 1,153,502 | 9/1915 | Kreigsheim | 423/579 |
| 1,916,457 | 7/1933 | Behrman | 423/499 |
| 3,944,487 | 3/1976 | Davis et al. | 423/579 X |
| 3,965,249 | 6/1976 | Kinosz | 423/499 X |

OTHER PUBLICATIONS

J. W. Mellor's "A Comp. Treatise on Inorg. and Theo. Chem.," vol. 14, 1935 Ed., p. 559, Longmans, Green & Co., N. Y.

*Primary Examiner*—Edward Stern
*Attorney, Agent, or Firm*—Walter J. Lee

[57] ABSTRACT

Hypochlorite ions in aqueous solution are catalytically decomposed by the action of a single-metal spinel of $Co_3O_4$, preferably coated on an inert, stable support. The $Co_3O_4$ catalyst may contain dispersed therein, optionally, other "modifier" metal oxides which do not affect the single-metal spinel structure of the $Co_3O_4$, but which contribute better adherence of the $Co_3O_4$ to the substrate and improve the toughness of the $Co_3O_4$ coating.

9 Claims, 1 Drawing Figure

CATALYTIC DECOMPOSITION OF HYPOCHLORITE

BACKGROUND OF THE INVENTION

Aqueous solutions containing hypochlorite ions, [ClO]$^-$, are corrosive to many metals and are highly toxic to aquatic life. Hypochlorite-containing solutions which are evolved as waste streams or side-products require treatment to remove or destroy the deleterious hypochlorite ions before the aqueous stream can be released into rivers, bays or other public waters. Aqueous waste streams containing hypochlorite ions are produced, for example, by chlor-alkali production facilities.

Various methods are known for destroying hypochlorites, but they are too inefficient or too expensive for large scale applications involving very large quantities of aqueous streams which contain hypochlorites.

Thermal decomposition may be used in some cases, but when large quantities of dilute hypochlorites require decomposition, the cost of heat (energy) becomes prohibitive, and the rate of decomposition is inefficiently slow. In addition to the cost of the heat, it is necessary in some instances to cool the aqueous stream before it reaches public waters in order to avoid "thermal pollution". Cooling the aqueous stream requires extra handling and energy consumption and therefore, increased costs.

Actinic radiation (light) accelerates the decomposition, but this requires either using large glass vessels (impractical) or the use of light sources inside opaque vessels and is inefficiently slow for large scale use.

Hypochlorite is chemically reactive, but proposed reactants are either expensive (e.g., $H_2O_2$), tend to produce deleterious side products (e.g., NaHS), or require concentrated solutions (e.g., HCl). Usually the reaction product would require recovery because of ecological or economical reasons.

It is well known that certain transition metal ions (e.g., from transition metal salts) catalyze the decomposition of hypochlorite to chloride ion plus molecular oxygen. However, practical utilization of this knowledge has been hindered by the reactivity and/or solubility of these transition metal ions in the solutions in which hypochlorite is likely to be found. It has been proposed that soluble transition metal salts be added to waste streams to decompose hypochlorite, but this would require an expensive and complex recovery step to prevent loss of the expensive transition metal ion and would risk the consequent pollution of the waste stream by the heavy metals.

In an application filed Dec. 12, 1974 as Ser. No. 531,934, now U.S. Pat. No. 3,977,958, which is a continuation-in-part of Ser. No. 425,410 filed Dec. 17, 1973, now abandoned, it is shown that an electroconductive substrate having a coating thereon of a single-metal spinel structure of $Co_3O_4$ is useful as an electrode in an electrolytic process. There is no suggestion that the $Co_3O_4$, if used as a catalyst instead of as an electrode, would promote the decomposition of aqueous hypochlorites.

There is a need for an efficient, economically feasible method for decomposing large quantities of dilute hypochlorite.

It is an object of the present invention to provide an efficient, commercially feasible method for destroying hypochlorites in aqueous streams.

A further object is to provide a means for destroying hypochlorites in aqueous streams without adding further chemicals to the aqueous stream which, for economical or ecological reasons, would require subsequent removal before the treated stream is released into public waters.

Another object is to destroy hypochlorites in aqueous streams without expending wasteful amounts of heat energy and without unduly risking thermal pollution of public waters.

Yet another object is to provide a catalyst for use in the present inventive method which is efficient, is non-polluting and is long-lived.

These and other objects are attained by the invention disclosed hereinafter. Variations in the embodiments described herein will become apparent to practitioners of the pertinent art without departing from the invention claimed.

SUMMARY OF THE INVENTION

Hypochlorite-containing aqueous solutions are contacted with a decomposition catalyst comprising single-metal spinel $Co_3O_4$, preferably coated onto an inert substrate, the $Co_3O_4$ coating containing, optionally, at least one dispersed "modifier oxide" which is stable in the hypochlorite-containing solution in which it is intended for use.

DETAILED DESCRIPTION OF THE INVENTION

Figure 1:
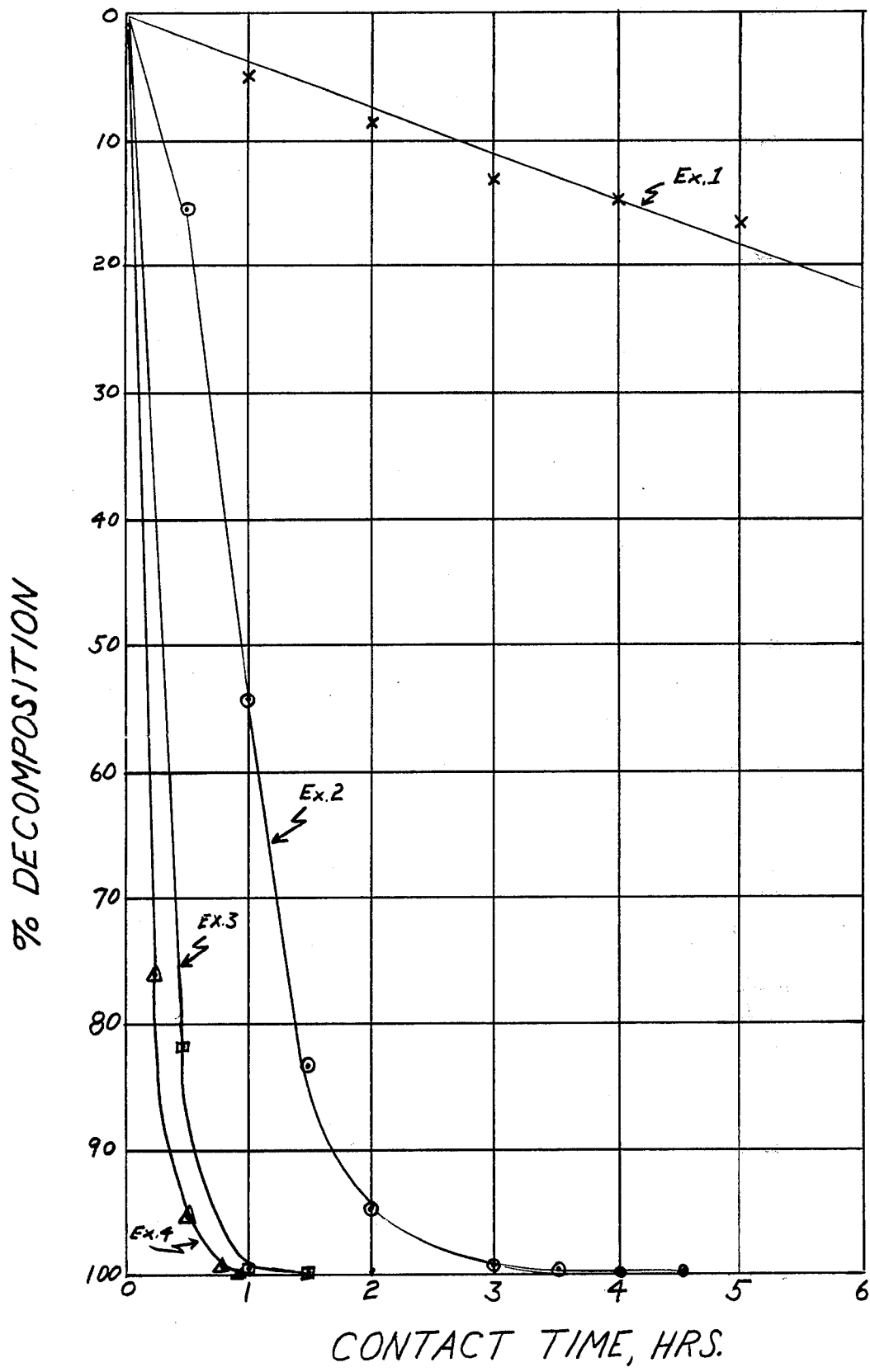

The hypochlorite-containing aqueous solutions which are treated in the present invention may be any aqueous solution which contains hypochlorite moieties, e.g., hypochlorous acid or salts of hypochlorous acids, such as alkali metal hypochlorites.

One well-known source of aqueous streams containing hypochlorite ions as a "waste" material is in the scrubbing step of a chlorine liquefaction plant where the non-condensibles (usually called "tail gas") are scrubbed with a caustic solution to prevent residual chlorine in the "tail gas" from entering the atmosphere. This scrubbing stream contains alkali metal hypochlorite (e.g., NaOCl) which requires decomposition to, e.g., NaCl and $O_2$ before being discharged into public waters, such as bays or other estuaries. There are other sources of hypochlorite-containing aqueous waste streams which are treatable by the present invention, especially in operations involved in, or related to, chlor-alkali production.

The single-metal spinel crystalline structure of the present invention is identified as $Co_3O_4$, the structure being readily identified by X-ray diffraction analysis methods such as taught by H. P. Klug, et al. in *X-Ray Diffraction Procedures* published by John Wiley & Sons, NYC (1954) or by using a standard Norelco Goniometer equipped with an AMR monochromator on the receiving detector assembly, using unfiltered CuK$_4$ radiation.

The "modifier oxide" used optionally in the present invention may be any metal oxide which is essentially stable with respect to the aqueous solution in which it is intended to be used and which does not destroy or disrupt the single-metal spinel crystalline structure of the $Co_3O_4$ in which the modifier oxide is dispersed. Among the metals whose oxides may be used herein are those of Groups III-A, III-B, IV-A, IV-B, V-A, V-B, VI-B and VII-B and the lanthanides and actinides of the Periodic Table. More than one modifier oxide may be used in the same $Co_3O_4$ catalyst.

Preferably, the modifier oxides are oxides of metals selected from the group consisting of zirconium, tungsten, lead, vanadium, tin, tantalum, niobium, molybdenum, aluminum, cerium, bismuth, chromium, antimony and titanium.

Most preferably, the modifier oxides are oxides of zirconium, vanadium and lead.

The substrate employed in the present invention is any solid substrate to which the $Co_3O_4$ coating will attach and which is essentially stable (inert) with respect to chemical attack from the aqueous solution being treated. The substrate is preferably in a form which will expose a relatively high ratio of surface area/volume of the $Co_3O_4$ catalyst, yet which will have sufficient physical integrity that it will not be easily attrited, decrepitated or otherwise broken during normal usage, handling and recovery. Also, it is preferred that the particles of supported catalyst not be so small and free to move that they become too easily entrained in the aqueous stream leaving the treating vessel.

The substrate may be a noble or substantially inert metal, a film-forming metal (also called "valve metal"), or an essentially inert non-metal or inorganic material such as ceramic, glass, graphite, refractory, asbestos, mineral fibers, and others. Supports such as high-temperature stable polymers and resins may be employed as substrates but are not generally preferred and not very many are capable of withstanding temperatures above 200° C.

Among the noble or substantially inert metals which may be used as substrates are, e.g., platinum, palladium and ruthenium. These are operable, but are also very expensive.

Among the film-forming metals which may be used as substrates are, e.g., titanium, tantalum, niobium, molybdenum, zirconium, vanadium, tungsten and hafnium. These film-forming metals may be employed with or without the oxide film which forms on the surface when exposed to oxygen.

Among the ceramics, glass, refractories, and other inorganic materials which may be used as substrates are, e.g., soda lime glass, borosilicate glass, vitreous silica, alumina, titania, zirconia, silica, magnesia, aluminum silicate, zirconium silicate, magnesium aluminate, chemical porcelain, chemical stoneware, oyster shell, limestone, dolomite. Aluminum silicate, alumina and chemical stoneware are preferred.

The substrate may be of almost any form and shape, e.g., small plates, rods, cylinders, blocks, spheres, screens, or "saddles". Foraminous substrates offering high ratios of surface area/volume are very suitable, especially if the foraminous substrate has the physical integrity to substantially withstand handling and long-term usage without much breakage. Particulate $Co_3O_4$, when pressed under high pressure into pellet form, is an effective catalyst. Also $Co_3O_4$ which is deposited onto a particulate substrate and then pelletized is an effective catalyst. It is preferred that when the supported catalyst is to be "packed" into a treating tower or other vessel, the configuration of the substrate pieces be such that not more than a minimum amount of "blinding" or "channelling" is obtained.

In the case of substrates made of inorganic materials, e.g., ceramic, glass or refractory material, the shape and size of the well-known "Berl Saddles" offers an efficient combination of surface/volume, physical strength and non-blinding for use in packed towers. The material from which the Berl Saddles are made is known as chemical stoneware.

In the case of metal screen substrates, these can normally be easily stacked in planar fashion in such a way that the holes do not exactly line up "in-row", whereby blinding or channelling is substantially avoided.

Once the present invention is learned, it is considered to be within the skill of a trained engineer or other technologist to select the best shape, size and disposition of the supported catalyst for his particular application and apparatus.

The $Co_3O_4$ coating is applied to the substrate by applying a thermally-decomposable, thermally-oxidizable cobalt compound to the substrate, then heating in air at a temperature in the range of about 200° C to about 600° C. The heating time required is usually from about 5 minutes at the upper end of the temperature range to several hours at the lower end of the temperature range. This temperature range is fairly critical; at temperatures much below about 200° C the process is inefficiently slow and substantially complete formation of the desired $Co_3O_4$ is not assured, while at temperatures much above about 600° C (especially at extended heating times) substantially complete formation of the $Co_3O_4$ is not assured. At temperatures approaching about 700°–750° C, a different form of cobalt oxide is apparently formed, especially if one or more modifier oxides are being simultaneously applied. The preferred temperature is in the range of about 300° C to 450° C for a period of about 10 minutes to 3 hours.

Generally, the coating operation provides, at each coating application, a very thin layer of the $Co_3O_4$. Therefore, in order to be assured that a good, strong, long-life coating is obtained with few or no pin-holes, it is advantageous and preferable to repeat the coating step at least once. Several coatings may be applied, if desired.

The modifier metal oxide is provided in the $Co_3O_4$ layer by being mixed, as metal oxide, with the thermally-oxidizable cobalt compound at the time the cobalt compound is applied to the substrate or may be formed along with the $Co_3O_4$ from a thermally-decomposable, thermally-oxidizable compound of the metal. Organic salts and many inorganic salts of the metals are particularly suitable as a source material for the modifier metal oxides.

Thermally-decomposable, thermally-oxidizable cobalt compounds suitable for forming the single-metal spinel $Co_3O_4$ include, but are not limited to, organic cobalt compounds, e.g., cobalt naphthenate, cobalt octoate, and other cobalt salts of fatty acids or other organic cobalt salts. Also, inorganic cobalt compounds such as cobalt salts of mineral acids (e.g., cobalt nitrate, cobalt chloride, cobalt sulfate, cobalt hydroxide, cobalt carbonate) may be used and are generally preferred over the use of the organic cobalt compounds. Particularly suitable and preferred is the use of hydrated cobalt nitrate applied to the substrate as a melt or cobalt nitrate carried in an easily volatilized medium such as water, acetone, alcohol, aldehyde, ketone, ether or cyclic ether.

The use of the modifier oxide is to enhance or improve the adherence of the $Co_3O_4$ to the substrate and to provide a "tougher" coating of $Co_3O_4$, thereby obtaining a $Co_3O_4$ coating which will better withstand handling without being broken or chipped. The amount of modifier oxide, when employed, may be from zero up to about 50 mole percent of the total coating, preferably about 0 to about 30 mole percent. As used herein, the term "mole percent" refers to the amount of modifier metal oxide, measured as metal, in the total metal content of the coating. As the mole ratio of $Co_3O_4$/modifier metal oxide in the coating approaches 1/1, the crystallinity, as shown by x-ray diffraction, is found to diminish considerably. Other inert, stable material may be employed as "fillers" or "extenders" in the $Co_3O_4$ catalyst without departing from the present invention, though such additives may have little or no effect on the catalyst activity. For instance, sand, asbestos fibers or graphite particles may be incoporated into the $Co_3O_4$ catalyst.

As stated hereinbefore, it is preferred that the $Co_3O_4$ coating be applied by a plurality of applications where each application consists of applying a coating of the thermally-oxidizable cobalt compound and then heating in the range of about 200° C to about 600° C. It appears that during the heating period for each subsequent coating, the previous layer of $Co_3O_4$ is densified or compacted because of the additional heat. This densification or compacting appears to give a stronger coating than if a single heating period is employed.

In the following demonstrations, opaque equipment is used in order to avoid the effect of actinic radiation. In Examples I-IV the solution being treated is a commercial NaOCl solution ($\simeq$6.2% NaOCl, pH 12.1). This solution was chosen for the demonstrations because of its relatively high NaOCl content and its relatively high stability. The solution is fed into a packed vertical column having a length/width ratio of about 12. The temperature of the solution was maintained at about 80° C, ±2° C in order to provide a comparison between uncatalyzed thermal decomposition (Example I) and the catalyzed decomposition according to the present invention (Examples II-IV). In these demonstrations the solution was re-cycled during the course of each run in order to obtain the desired residence time. Samples were taken at intervals in order to analyze for NaOCl remaining.

FIGURE I attached hereto demonstrates the decomposition curves of Examples I, II, III and IV.

EXAMPLE I (Comparative Run, not illustrative of invention)

The column was packed with commercially available ¼-inch (~0.64 cm) ceramic packing known as Berl Saddles which had been cleaned with concentrated HCl, washed with deionized water, rinsed with acetone and vacuum-dried at 100° C. The NaOCl solution (80° C) was cycled continuously through the packed column and samples were taken at intervals for analysis. After 1 hour about 5% of the NaOCl had been decomposed; after 2 hours about 8% of the NaOCl had been decomposed; after 3 hours about 13% of the NaOCl had been decomposed; after 4 hours about 14% of the NaOCl had been decomposed; after 5 hours about 17% of the NaOCl had been decomposed; after 8 hours about 25% of the NaOCl had been decomposed.

EXAMPLE II

A support of Berl Saddles (cleaned and dried as in Example I above) was coated with $Co_3O_4$ catalyst containing $ZrO_2$ as a modifier oxide for use in the same apparatus and method of Example I. The catalyst coating was applied to the support by applying a solution of cobalt octoate (12% Co) and "Zirconium NuXtra" (6% Zr) to the surfaces of the support and then heating the so-coated support for 15 minutes at 400° C, thereby forming $Co_3O_4$ having $ZrO_2$ dispersed therein. The solution of metal organics used had a weight ratio of cobalt-/zirconium of about 7.09. The "cobalt octoate" and "Zirconium NuXtra" are commercially available from Tenneco Chemicals, Inc. and consist of the metal salt of fatty acid diluted with mineral spirits to the specified metal content.

The coating and heating steps were repeated five times and the sixth (last) coat was heated at 400° C for 60 minutes.

The apparatus of Example I was packed with the supported $Co_3O_4$ catalyst described immediately above and the same process as Example I was run. After one-half hour about 16% of the NaOCl had been decomposed; after one hour about 54% had been decomposed; after one and one-half hours about 83% had been decomposed; after two hours about 95% had been decomposed; after three hours about 99.4% had been decomposed; after three and one-half hours about 99.9% had been decomposed; after four hours about 99.95% had been decomposed; after four and one-half hours about 99.98% had been decomposed.

EXAMPLE III

This run was the same as Example II above except that no modifier oxide ($ZrO_2$) was used; the catalyst layer on the support comprised only $Co_3O_4$. After one-half hour about 82% of the NaOCl had been decomposed; after one hour about 99.2% had been decomposed; after one and one-half hours over 99.98% had been decomposed.

EXAMPLE IV

In this run commercial sponge titanium pieces (nominally about 0.64 cm to 2.54 cm in size) were employed as substrate. A mixture of cobalt octoate and Zirconium NuXtra as used in Example II above was used in this run. The pieces of sponge were thoroughly covered (in a vacuum pot) with the solution of metal compounds and subjected to reduced pressure for several hours (to remove most of the mineral spirits). The so-coated pieces of sponge were spread on a tray and baked for three and one-half hours as the temperature was slowly raised from about 175° C to about 350° C thereby forming $Co_3O_4$ and $ZrO_2$. The pieces were cooled, placed in the vacuum pot, and coated a second time in the same manner as the first coating except this time the baking was done for two hours as the temperature was slowly raised from 150° C to 400° C.

The titanium sponge pieces, now covered with $Co_3O_4$ (having $ZrO_2$ dispersed therein) were employed in the same apparatus and method of Example I. After one-quarter hour about 77% of the NaOCl had been decomposed; after one-half hour about 96.4% had been decomposed; in three-quarters of an hour about 99.5% had been decomposed; after one hour about 99.95% had been decomposed.

EXAMPLE V

An aqueous stream containing about 36.55 gms/liter of NaOCl is neutralized with HCl to a pH of about 8.2–8.5 and is then passed through a decomposition catalyst contained in a vertical vessel. The catalyst is $Co_3O_4$ supported on ceramic pellets (about 0.46 cm × 0.95 cm) and is packed into a polymer-lined steel vessel which has a volume of about 23.5 liters. The catalyst is prepared by coating the ceramic pellets with an aqueous solution of cobalt nitrate, then heating the pellets up to 400° C and holding at that temperature for about 10 minutes; the coating and heating is repeated twice. The catalyst packing fraction is about 75%. The vessel is a cylindrical shape having an inside diameter of about 10.2 cm. The temperature of the stream is about 68–73° C as it comes from its source and is passed through the treating column without being deliberately heated or cooled.

The aqueous stream is passed through the catalyst at a rate of about 2.67 liters per minute, thereby providing a residence time of about 2.2 minutes. Analysis shows that about 71% of the NaOCl is decomposed. The process, when run continuously for several months, is found to suffer no detectable loss of catalyst activity.

In similar runs, it is found that slower flow rates and/or longer flow paths through the catalyst, thereby increasing the contact time, gives increased decomposition.

EXAMPLE VI

Another run is made using the catalyst and apparatus of Example II except that the temperature is maintained at 50°±2° C. This temperature is representative of some of the hypochlorite-containing effluent streams from a chlor-alkali production facility to which no supplemental heat is added. The stream is highly alkaline. The contact times/% decomposition are as follows: one-half hour/20%; one hour/32%; two hours/54%; three hours/69%; four and one-half hours/84%.

The decomposition of a hypochlorite stream at a high alkaline pH can be accelerated by lowering the pH by the addition of an acid, especially HCl. The pH should not be lowered to less than ~5.0 because if enough HCl is added to make the solution highly acid, then $Cl_2$ is emitted and this would pose about the same pollution problem as tail gases or stack gases containing effluent chlorine gas.

The catalyst of the present invention does not rely on being promoted or accelerated by heat, actinic radiation, pH-adjusters, or chemical accelerators, but these do provide beneficial effects of their own and the cumulative effect may be desired in some cases.

Thus it is within the purview of the present invention to employ pH-adjusters to bring the pH down to lower the alkalinity before bringing the stream into contact with the $Co_3O_4$ decomposition catalyst.

The catalyst of the present invention may be beneficially coupled with, or used along with, other decomposition agents.

We claim:

1. In a process of catalytically decomposing hypochlorites into oxygen and chloride, wherein said hypochlorites are of the group consisting of hypochlorous acid and metal salts of hypochlorous acid, and are in aqueous solution at a pH of not less than about 5.0 said process comprising contacting the hypochlorites with an oxide of cobalt as the catalyst, the improvement which comprises using single-metal spinel $Co_3O_4$ as the catalyst.

2. The improved process of claim 1 wherein the $Co_3O_4$ catalyst is supported by a substrate selected from the group consisting of noble metals, valve metals, transition metals, mineral fibers, asbestos, graphite, and refractories.

3. The process of claim 2 wherein the substrate is at least one of the group consisting of aluminum silicate, alumina, chemical stoneware, or titanium sponge.

4. In a process of catalytically decomposing hypochlorites into oxygen and chloride, wherein said hypochlorites are of the group consisting of hypochlorous acid and metal salts of hypochlorous acid and are in aqueous solution at a pH of not less than about 5.0, said process comprising contacting the hypochlorites with an oxide of cobalt as the catalyst, the improvement which comprises using single-metal spinel $Co_3O_4$ as the catalyst, wherein the $Co_3O_4$ contains dispersed therein a modifier oxide which is substantially inert with respect to the aqueous solution, said modifier oxide being at least one oxide of the metals of Groups III-A, III-B, IV-A, IV-B, V-B, VI-B, VII-B, Lanthanides, and Actinides of the Periodic Table of the Elements, said modifier oxide being present in an amount not more than 50 mole percent, as the metal, of the total $Co_3O_4$/modifier oxide.

5. The process of claim 4 wherein the $Co_3O_4$ catalyst is supported by a substrate selected from the group consisting of noble metals, valve metals, transition metals, mineral fibers, asbestos, graphite, and refractories.

6. The process of claim 4 wherein the modifier metal oxide is an oxide of at least one of the metals selected from the group consisting of zirconium, lead, vanadium, tantalum, niobium, molybdenum, cerium and titanium.

7. The process of claim 1 wherein the hypochlorite in aqueous solution is present as dissolved hypochlorous acid.

8. The process of claim 1 wherein the hypochlorite in aqueous solution is present as dissolved alkali metal hypochlorite.

9. The process of claim 8 wherein the alkali metal hypochlorite is NaOCl.

* * * * *

UNITED STATES PATENT AND TRADEMARK OFFICE
CERTIFICATE OF CORRECTION

PATENT NO. : 4,073,873

DATED : February 14, 1978

INVENTOR(S) : Donald Lee Caldwell and Raymond John Fuchs, Jr.

It is certified that error appears in the above-identified patent and that said Letters Patent are hereby corrected as shown below:

Col. 2, line 58; change "$CuK_4$" to --$CuK_\alpha$--.

Col. 5, line 13; change "incoporated" to --incorporated--.

*Signed and Sealed this*

*Twenty-sixth* Day of *February 1980*

[SEAL]

Attest:

SIDNEY A. DIAMOND

*Attesting Officer*  *Commissioner of Patents and Trademarks*